Nov. 4, 1941.  B. W. KELLY  2,261,850

STEREOSCOPE

Filed Feb. 26, 1940

Inventor,
Benjamin W. Kelly,
By Frank S. Appleman,
Attorney,

Patented Nov. 4, 1941

2,261,850

UNITED STATES PATENT OFFICE 2,261,850

STEREOSCOPE

Benjamin W. Kelly, Meadville, Pa., assignor to Keystone View Company, Meadville, Pa., a corporation of Pennsylvania Application February 26, 1940, Serial No. 320,931

4 Claims. (Cl. 88—20)

This invention relates to optical instruments commonly known as stereoscopes, and an object of the invention, aside from its use for testing eyes under the directions of an oculist or an optician, is to provide a device adapted to a type of eye exercise designed to increase the accommodative amplitude.

In taking the foregoing exercise, the patient fixes the eyes on very small details, such as fine printing, on a card or slide in the slide holder either monocularly or with binocular fusion and moves the slide holder toward his eyes until the type begins to blur. This indicates the limit of accommodation for the moment, the generally accepted explanation being that the crystalline lens of the eye cannot continue to change its shape sufficiently to produce a sharp focus on the retina. When the slide holder is moved away from the eyes, the type will become clear again and will remain clear until the outward limit of the focusing mechanism has been reached. In order to know what these limits are in terms of refraction, it is necessary to note the exact distance from the lens where the indistinctness of the printing occurs. This can readily be done by having a scale of appropriate design printed directly on the shaft of the stereoscope. If a mirror set at approximately 45 degrees to vertical is mounted on the slide holder, the patient can read the calibrations on the shaft or beam without taking his head from the hood of the instrument and thereby losing the accurate adjustment of focus already attained.

It is considered highly desirable that the accommodative range become greater as these exercises are pursued. With the mirror, it is easily possible to note the extent of increase by glancing at the scale reflected by the mirror each time the slide holder is moved to its nearest or farthest position from the lens and this can be done without disturbing the focus of the eye as would be the result if the head were removed from the hood of the stereoscope for the purpose of reading the scale directly.

Stereoscopes are now used very extensively as "home training" instruments and it is highly desirable that frequent reports be made to the oculist of the patient. Some of the most significant information which can be given depends upon the position of the slide holder at certain stages of the exercise. With a mirror supplied stereoscope, said information can be obtained readily and accurately, and the device of the invention can be used as a testing instrument for gross errors of refraction as, for example, a hypermetropic or far sighted person may set the slide holder beyond the normal or zero position on the shaft, while a myopic or near sighted person must set the slide holder nearer than the normal or zero position. Without the mirror, these variations on the shaft are seldom noted. It of course must be assumed that the zero point on the shaft or beam is the location where the rays are parallel and this location must be determined by the strength of the lenses employed.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which.

Figure 1:
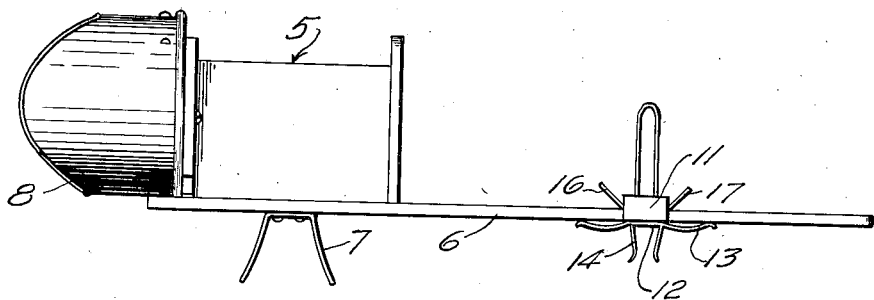
Figure 1 illustrates a view in side elevation of a conventional form of stereoscope with mirrors applied to the slide.
Figure 2:
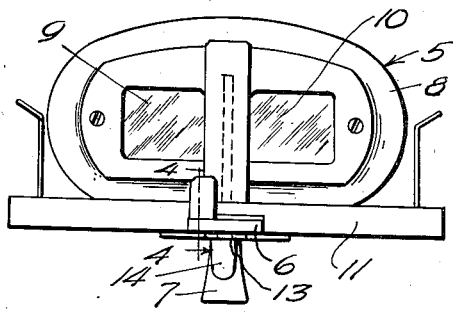
Figure 2 illustrates an end view from the outer end of the stereoscope.
Figure 3:
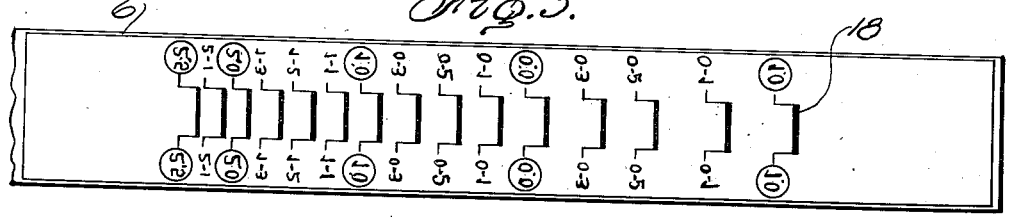
Figure 3 illustrates a plan view of the scale employed in connection with the mirrors.
Figure 4:
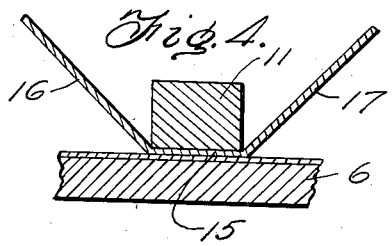
Figure 4 illustrates an enlarged sectional view of the slide, reflector and shaft.

In the drawing 5 denotes a conventional form of stereoscope having a shaft or beam 6, the same to be hereinafter referred to as a "shaft," to which shaft a conventional form of handle 7 is attached. The hood 8 of any appropriate form is associated with lenses 9 and 10 and the view or card holder 11 is slidable on the shaft and is held in operative position thereon by a plate 12 having resilient extensions 13 bearing against the under side of the shaft, and the said plate also has finger grasps 14, by which the slide is manipulated on the shaft. The slide has a plate 15 attached to and underlying it and the said plate has extensions 16 and 17 which project forwardly and rearwardly of the slide at an angle of about 45 degrees with respect to the upper surface of the shaft. The extensions 16 and 17 are mirrors or reflectors.

As illustrated, the upper surface of the shaft has a scale 18 comprising a plurality of graduated cross lines. Each cross line has indicia denoting its relation to zero which is the point where the rays are parallel, as heretofore explained. The said indicia are offset from the cross lines toward the lens, and the offset indicia are in position to be observed in the reflector when the slide is on the line designated by the indicia so that, as heretofore stated, the distance of the slide from the lens may be noted and recorded.

The scale is also adapted for use so that it may be observed when one or the other eye is closed or being tested. If the right eye is being tested, the slide will be positioned on the shaft so that the mirror is in line with the indicia on the right hand edge of the shaft, whereas if the left eye is to be tested, the slide is reversed in order that the mirror will be positioned with respect to the indicia on the surface of the shaft at the left hand edge of the scale and the reflection in the mirror may be read by the user. Thus, the mirror may be off center with respect to the length of the holder and function in conjunction with either of the two rows of indicia by reversing the position of the slide on the shaft.

I claim:

1. In a device for testing and treating human eyes, a frame, a pair of stereoscopic lenses supported in said frame, a beam extending forwardly from said frame and centrally between said lenses, a card supporting slide mounted on said beam for movement longitudinally thereof, scale indicia on the upper surface of said beam, and means movable with the slide for reflecting said scale indicia through at least one of said lenses.

2. In a device for testing and treating human eyes, a frame, a pair of stereoscopic lenses supported in said frame, a beam extending forwardly from said frame and centrally between said lenses, a card supporting slide mounted on said beam for movement longitudinally thereof, scale indicia on the upper surface of said beam, and a mirror fixed to the rear of said slide immediately over said beam, said mirror being inclined upwardly and rearwardly at an angle to reflect the scale indicia through one of said lenses.

3. In a device for testing and treating human eyes, a frame, a pair of stereoscopic lenses supported in said frame, a beam extending forwardly from said frame and centrally between said lenses, a card supporting slide mounted on said beam for movement longitudinally thereof, scale indicia on the upper surface of said beam, and a mirror fixed to the rear of said slide immediately over said beam, said mirror being inclined upwardly and rearwardly at an angle to reflect the scale indicia through one of said lenses, said scale indicia being inverted from normal reading position whereby reflection from the mirror will afford a normally reading image.

4. In a device for testing and treating human eyes, a frame, a pair of stereoscopic lenses supported in said frame, a beam extending forwardly from said frame and centrally between said lenses, a card supporting slide mounted on said beam for movement longitudinally thereof, scale indicia on the upper surface of said beam, and a mirror fixed to the rear of said slide immediately over said beam, said mirror being inclined upwardly and rearwardly at an angle to reflect the scale indicia through one of said lenses, said scale indicia being inverted from normal reading position whereby reflection from the mirror will afford a normally reading image, said beam having graduations set forwardly from the indicia, each graduation being coincident with the rear edge of the slide when the mirror is positioned to reflect a respective index.

BENJAMIN W. KELLY.